United States Patent [19]

Matchett et al.

[11] Patent Number: 4,903,281
[45] Date of Patent: Feb. 20, 1990

[54] SYSTEM FOR FUEL ROD REMOVAL FROM A REACTOR MODULE

[75] Inventors: Richard L. Matchett, Bethel Park; David R. Roof, North Huntingdon; Thomas J. Kikta, Pittsburgh; Rosemarie Wilczynski, McKees Rocks; Roy J. Nilsen, Pittsburgh; William S. Bacvinskas, Bethel Park; George Fodor, Pittsburgh, all of Pa.

[73] Assignee: The United States of America as represented by the United States Department of Energy, Washington, D.C.

[21] Appl. No.: 225,435

[22] Filed: Jul. 28, 1988

[51] Int. Cl.[4] .............................................. G21C 19/00
[52] U.S. Cl. .................................................... 376/264
[58] Field of Search ................. 376/248, 264, 268–271

[56] References Cited

U.S. PATENT DOCUMENTS

| | | | |
|---|---|---|---|
| 4,374,801 | 2/1983 | Albin | 376/264 |
| 4,385,028 | 5/1983 | Salaman | 376/264 |
| 4,511,531 | 4/1985 | Swidwa et al. | 376/262 |
| 4,643,867 | 2/1987 | Hornak et al. | 376/248 |
| 4,647,423 | 3/1987 | Hawke | 376/264 |

*Primary Examiner*—Allen MacDonald
*Attorney, Agent, or Firm*—William W. Randolph; William R. Moser; Richard E. Constant

[57] ABSTRACT

A robotic system for remote underwater withdrawal of the fuel rods from fuel modules of a light water breeder reactor includes a collet/grapple assembly for gripping and removing fuel rods in each module, which is positioned by use of a winch and a radial support means attached to a vertical support tube which is mounted over the fuel module. A programmable logic controller in conjunction with a microcomputer, provides control for the accurate positioning and pulling force of the rod grapple assembly. Closed circuit television cameras are provided which aid in operator interface with the robotic system.

8 Claims, 5 Drawing Sheets

SYSTEM FOR FUEL ROD REMOVAL FROM A REACTOR MODULE

BACKGROUND OF THE INVENTION

This invention relates generally to systems for handling fuel rods for an atomic fuel reactor, and more particularly to systems for automatically removing fuel rods one at a time from a light water breeder reactor (LWBR) module for transfer and storage in a rod transfer container.

The design of a breeder reactor for a light water system imposes requirements on the fuel elements and support grids relative to reaction characteristics. One of the requirements for breeding is that the core have a high ratio of fuel-to-water, which results in closer fuel rod spacing than in, for example, pressurized water reactor (PWR) designs. In a light water breeder reactor (LWBR) core, the fuel, which is in the form of cylindrically shaped ceramic fuel rods, is placed in a close packed, triangular pitch with rod-to-rod spacing of about 0.060 inch.

The present system for removal of expended fuel rods is designed as an underwater robotic system capable of extracing fuel rods, one at a time, from LWBR fuel modules and depositing them in transfer or storage containers. The system utilizes an on-line microcomputer for positioning removal components, calculating fuel rod location coordinates, and maintaining rod movement and storage location records. The system is designed for remote underwater removal of fuel rods, one at a time from LWBR fuel modules which operates by aligning a grappling device over exposed ends of fuel rods for engagement of the rod. The use of an automated rod removal system rather than a simpler method such as manual pulling of rods from overhead walkways, is advantageous in that it limits and closely monitors rod pull force by obtaining accurate rod pull force data; it minimizes the chance for dropping rods into the water pit by monitoring successful engagement of the rod pull tool on the rod end; it pulls rods out of the module vertically to prevent rod bending or unnecessary scratching of the rod cladding; and it is capable of accurately locating the correct rod in the module through twenty feet of water.

SUMMARY OF THE INVENTION

It is thus an object of the present invention to provide a system for automatically and confidently removing fuel rods from an LWBR module.

It is a further object of the present invention to prevent damage of delicate fuel rods by accurately monitoring fuel rod pull forces and the direction of fuel rod removal.

It is a still further object of the present invention for automatically maintaining records of fuel rod removal and storage locations.

The objects of the present invention are fulfilled by providing a system for removing and transferring a plurality of fuel rods from a reactor module comprising an elongated support tube vertically mounted above said module, angular drive means, rigidly supported above said support tube, for rotating said support tube about its vertical access, fuel rod grapple assembly means for engaging said fuel rods in said module, winch means for vertically positioning said fuel rod grapple assembly means so as to engage a fuel rod in said module and for removing an engaged fuel rod from said module by vertically retracting said grapple assembly means from said module, first radial support means, horizontally extending from said support tube, for supporting said winch means above a selected fuel rod, radial drive means, mounted adjacent said support tube, for horizontally positioning said winch means over a selected fuel rod, and control means for controlling the operation of said angular drive means, grapple assembly means, winch means, and radial drive means, to sequentially and systematically remove preselected fuel rods from said module for transfer and storage thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
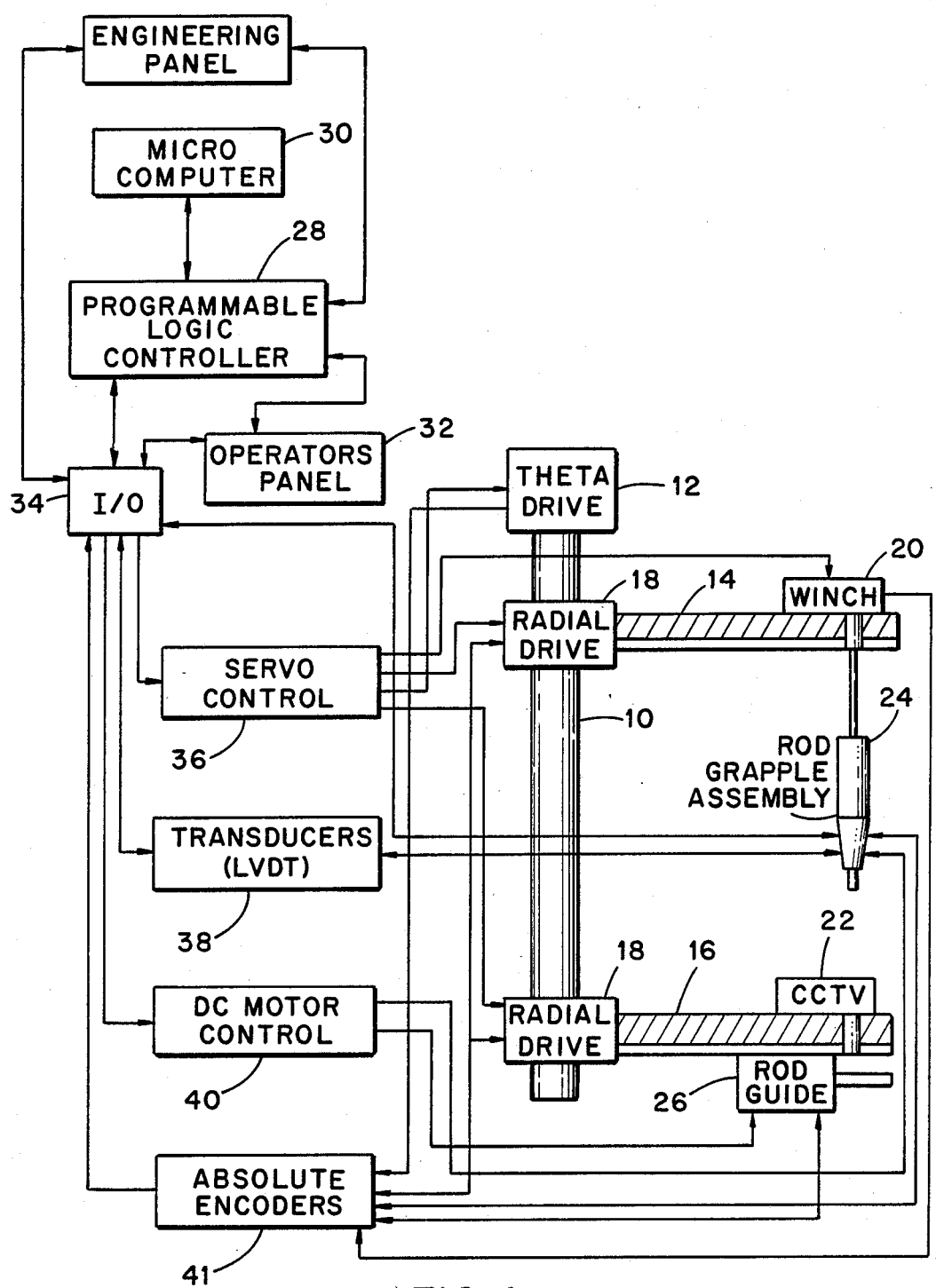
FIG. 1 is a schematic diagram of a preferred embodiment of a rod removal system according to the present invention.

FIG. 1 is a schematic diagram illustrating a preferred embodiment of the rod removal system of the present invention wherein a cylindrical support tube 10 provides the backbone of the system to which radial arms 14 and 16 are mounted and aligned with each other. Element 12 is a theta drive mechanism whose primary function is to rotate the entire rod removal system about its axis to position a rod grapple assembly 24 accurately over the desired rod to be pulled. The theta drive is fastened to the water pit wall of the examination and disassembly facility and the support tube is bolted to the theta drive mechanism.

Radial drive mechanisms 18 transport a winch mechanism 20, a closed circuit television (CCTV) camera 22 and a rod guide mechanism 26, respectively. Element 24 denotes the rod grapple assembly which is the primary component in the process of pulling rods from a fuel module. The winch 20 lowers the rod grapple assembly to contact with the end of a specified fuel rod for engagement of the rod by the grapple assembly. When the grapple establishes a grip on the fuel rod, the winch lifts both the grapple and the fuel rod.

The entire system is controlled by a programmable logic controller 28 which interfaces with a microcomputer 30, an operator via operating panel 32, and various control functions of the rod removal system such as servo control 36, linear variable displacement transducer 38, DC motor control 40, and absolute encoders 41, via an input/output interface 34.

The programmable logic controller or PLC controls the sequence and specific steps of the operation to be peformed. Each individual rod in the module is provided with an identifying serial number, the identification of specific rods to be removed and transferred to a storage container are stored in a memory of the computer 30 and are retrieved from memory depending on the type of module, and the type of rod being attended to.

The initial phase for removing rods from a module is the determination of coordinates for positioning the grapple mechanism. The mechanical assemblies of the system are designed to operate in a polar coordinate system. Using the CCTV 22 and the operator panel 32, the operator locates three predetermined set points on the module. The PLC 28 automatically sends these coordinates to the microcomputer 30, which then calculates the coordinates for all the rods in that particular module as it is oriented in a support stand. Destinations for each rod are determined depending on the rod identity entered into a scheduling program.

The CCTV system affixed to lower radial arm carriage 16 is also used by the operator to confirm the computer alignment of the rod grapple assembly 24 over a fuel rod, as well as checking rod storage positions selected by the computer. The operator is able to jog the target camera manually to center the camera cross-hairs on the rod to be pulled after the computer has positioned the camera to the rod address. Upon cross-hair alignment, PLC 28 automatically shifts the grapple over the rod according to the coordinates of the CCTV camera. The grapple assembly 24 is then lowered down over the fuel rod to be pulled.

Figure 2:
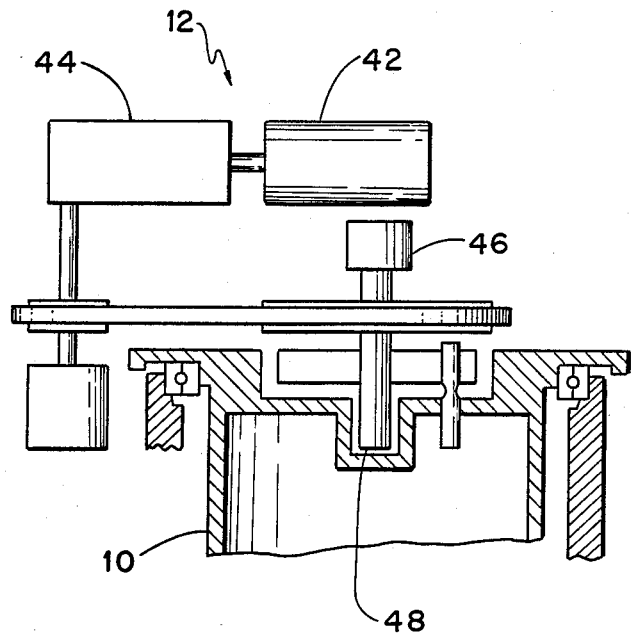
FIG. 2 is a schematic diagram of the theta drive component of FIG. 1.

FIG. 2 is a schematic of the theta drive system 12. The drive shaft 48 to which the support tube 10 is attached, is driven by a DC servomotor 42 geared down by speed reducer 44, thereby providing increased sensitivity to position the rod pulling mechanisms accurately over the proper rod location. Rotational positioning of the rod removal system is monitored by an absolute encoder 46 which monitors the precise angle at which the radial arms 14 and 16 are rotated. The data furnished by encoder 46 is provided to PLC 28 for feedback control to the DC servomotor via DC motor control 40. By monitoring the absolute encoder, the theta drive is capable of positioning the rod pulling mechanism to within 0.003 degrees.

Figure 3:
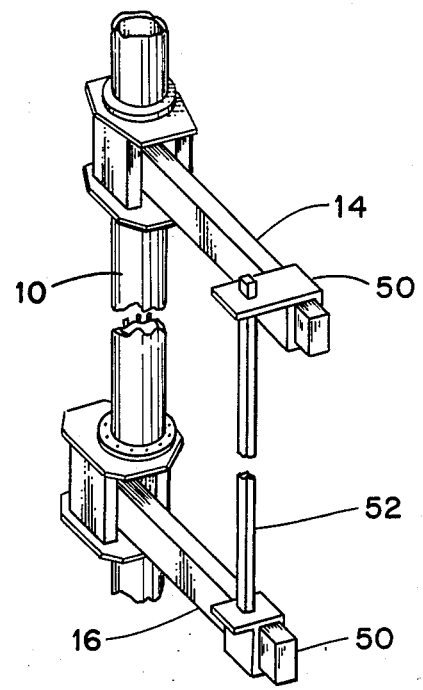
FIG. 3 is a schematic detail of the radial arms of FIG. 1.

FIG. 3 is a detail of the radial arms 14 and 16 of FIG. 1. A water bearing carriage 50 is positioned along each arm, with a vertical guide post 52 connected between the upper and lower bearings 50 for guiding the grapple assembly travel. The winch is mounted on the upper bearings while the CCTV camera and rod guide are mounted on the lower bearing.

Figure 4:
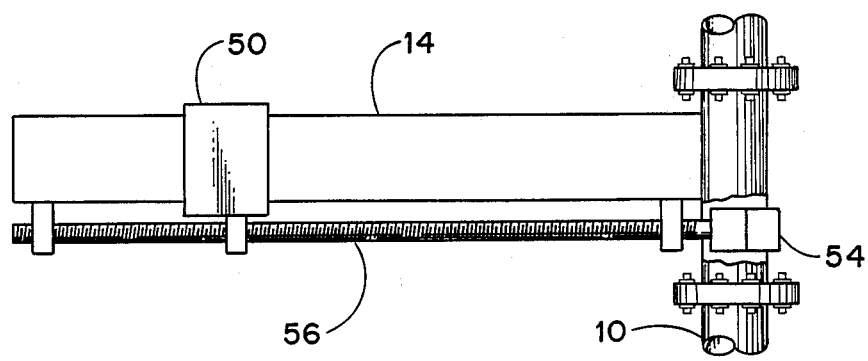
FIG. 4 is a schematic detail of the radial drive component of the system of FIG. 1.

As shown in FIG. 4, the water bearing carriages are positioned horizontally along each arm by a lead screw 56 driven by a DC servomotor 54. Absolute encoders are also connected to each lead screw for encoding the horizontal position of the water bearing carriage along each arm. This information is also supplied to PLC 28.

As shown in FIG. 1, the upper arm carriage 14 is used to support the winch mechanism 20 while the lower arm carriage 16 transports the rod locating CCTV 22, the rod guide mechanism 26, as well as a grapple guide bracket. Horizontal travel of the two transport carriages is synchronized by the programmable logic controller to maintain the guide post 52 in a vertical position.

The vertical force necessary to extract a fuel rod from a module is supplied by the winch 20, which supports the rod grapple assembly 24 by means of two roller chains. The winch is also powered by a DC servomotor and is linked to an absolute encoder similar to encoder 46 as shown in FIG. 2. The absolute encoder provides the vertical position of the grapple assembly 24 to within plus or minus 0.06 inches. The DC servomotor drives a pair of roller chain sprockets at a variable speed ranging from 0 to 6 feet per minute. The maximum speed of 6 feed per minute is specified for lowering rods such that the system is able to respond before rod stress limits are exceeded. The maximum lifting speed is limited to the response time for monitoring and recording rod pull forces every ¼ inch of travel.

Figure 5:
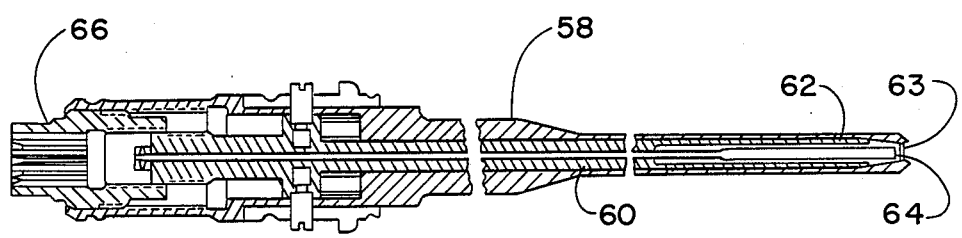
FIG. 5 is a schematic detail of the collet contained in the rod grapple assembly of FIG. 1.
Figure 6:
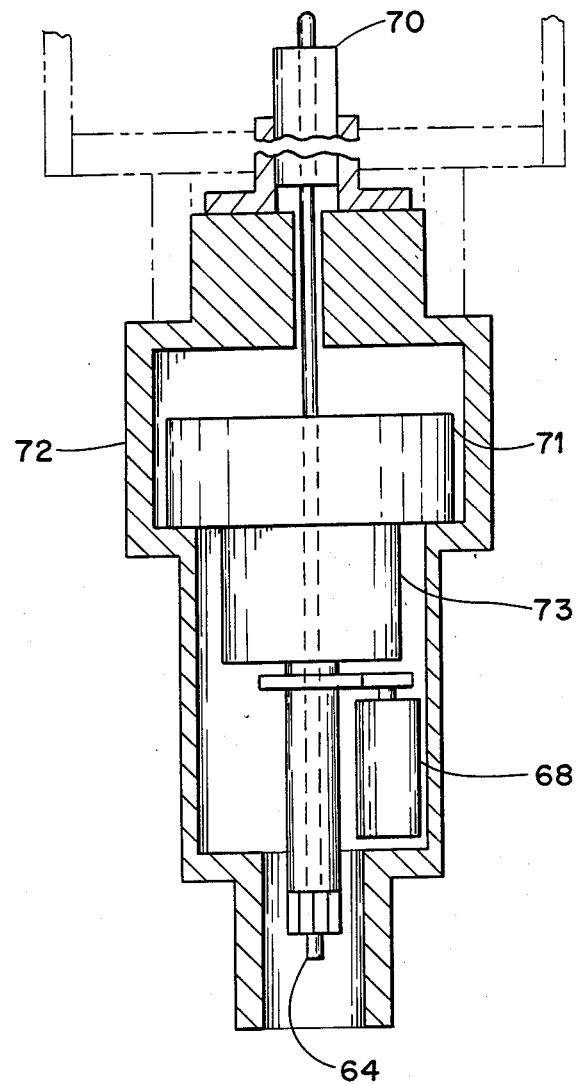
FIGS. 6 and 7 are schematic diagrams of the grapple lower and upper mechanisms for collet actuating and rotating components, respectively.

FIG. 5 illustrates the collet element of the grapple assembly which directly contacts the fuel rod in the module. The collet consists of an outer sleeve 58 and an inner sleeve 60 containing gripping fingers 62 at the end thereof. The outer sleeve 58 has a decreasing interior sleeve diameter towards an end 63 thereof. The end of the outer sleeve 63 is lowered over a fuel rod to be pulled. As the fuel rod is inserted into the collet, a push rod 64 is pushed back into the collet by the motion of the collet over the fuel rod. A compound nut 66 is activated by a DC servomotor to raise outer sleeve 58 relative to inner sleeve 60 thereby compressing inner sleeve gripping fingers 62 against the fuel rod. As shown in FIG. 6, the movement of push rod 64 actuates a linear variable differential transducer (LVDT) 70 located within the grapple housing 72, which indicates the amount of rod insertion into the collet. The LVDT position is monitored by the PLC to determine when the collet has fully engaged the fuel rod. If the LVDT position changes while rod pulling or transfer operations are being performed, these operations would automatically be ceased by the PLC.

Figure 7:
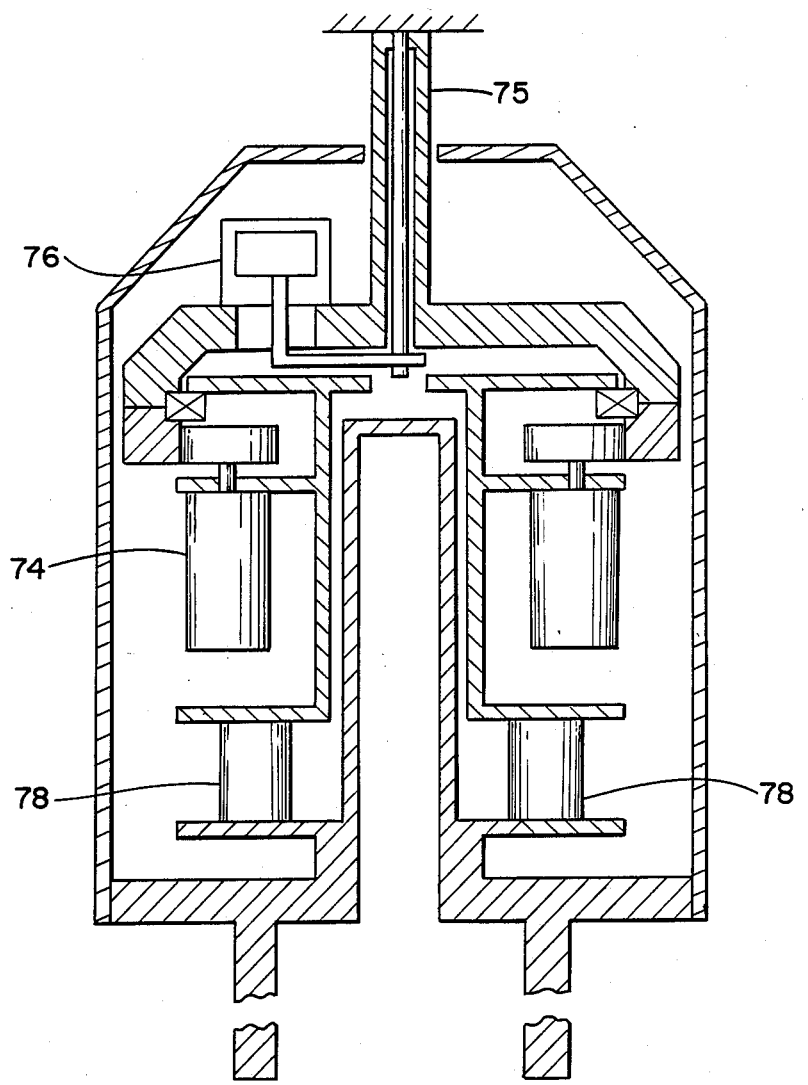

As shown in FIG. 7, a DC motor 74 is provided to rotate the collet while performing a rod pulling operation. During rod pulling, the rod is rotated 60 degrees after being pulled through to a predetermined distance to preserve the dimple and spring wear marks on the rod surface. The grapple rotation is also used to rotate the rod to a position which enables the serial number of the rod to be read by the CCTV camera. The torque on the fuel rod is monitored by measuring the rotational displacement of a calibrated torque tube 75 relative to a fixed position at the grapple suspension point, by a torque transducer 76. The compound nut 66 of the collet is actuated by actuating motor 71 and gear reducer 73 as shown in FIG. 6.

The grapple assembly also has the ability to measure the pull and push forces on the rod as it is being engaged and removed from the module, by mounting two load cells 78 in parallel which are connected by a pivoting beam. A pull force measurement capacity ranging from 0 to 1,000 lbs. is achieved by calibrating load cells 78 according to the type of module being worked.

The three function of the rod guide 26 shown in FIG. 1 are to surround the grapple collet to insure that the fuel rod is captured as it is withdrawn from the module, to restrain the lower end of the fuel rod thus preventing it from swinging freely during a transfer, and to accurately position the bottom of a rod over any of various port into which the rod is to be placed. Rod guide operation is monitored by an absolute encoder 46 to assure that jaws opening are compatible with selected rod size.

The programmable logic controller 28 may be of standard manufacture and in the preferred embodiment is implemented by a Modicon 584 of Gould Industries. Microcomputer 30 is implemented in the preferred embodiment by a MINC-11 by Digital Equipment Corporation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for removing and transferring a plurality of fuel rods from a reactor module, comprising:
   an elongated support tube vertically mounted above said module;
   angular drive means, rigidly supported above said support tube, for rotating said support tube about its vertical axis;
   fuel rod grapple assembly means for engaging said fuel rods in said module;
   winch means for vertically positioning said fuel rod grapple assembly means so as to engage a fuel rod in said module and for removing an engaged fuel rod from said module by vertically retracting said grapple assembly means from said module;
   first radial support means, horizontally extending from said support tube, for supporting said winch means above a selected fuel rod;
   radial drive means, mounted adjacent said support tube, for horizontally positioning said winch means over a selected fuel rod; and
   control means for controlling the operation of said angular drive means, grapple assembly means, winch means, and radial drive means, to sequentially and systematically remove preselected fuel rods from said module for transfer and storage thereof.

2. A system as set forth in claim 1, wherein said fuel rod grapple assembly means comprises:
   collet means for gripping a fuel rod, including an elongated inner sleeve member having a plurality of gripping fingers at one end thereof for surrounding said fuel rod, an elongated outer sleeve member concentrically contacting said inner sleeve member along the length thereof, said outer sleeve member having a gradually decreasing inner diameter in a direction towards said gripping fingers, and an actuating member for shifting the position of said outer sleeve member relative to said inner sleeve member such that the inner diameter of said outer sleeve member causes said gripping fingers to tighten around said fuel rod; and
   grapple means for driving said actuating member under control of said control means.

3. A system as set forth in claim 2, further comprising:
   rod guide means for surrounding said collet means to prevent horizontal movement of said fuel rod as said grapple assembly means is retracted from said module; and
   second radial support means, horizontally extending from said support tube, for supporting said rod guide means in alignment with said collet means.

4. A system as set forth in claim 2, wherein said control means comprises:
   programmable logic means for,
      determining coordinates of the positions of each said preselected fuel rod in said module,
      determining a transfer location for each said preselected fuel rod of said module,
      activating said angular drive means and radial drive means according to the determined positions of said preselected fuel rods and the determined transfer locations,
      activating said winch means and said grapple assembly means to engage and retract a preselected fuel rod from said module when said grapple assembly means has been located above said fuel rod by operation of said angular and radial drive means,
      monitoring the engagement of a fuel rod by said collet means and the pulling force of said winch means, and
      terminating operation of said grapple assembly means and said winch means when said fuel rod has not been properly engaged or the pulling force of said winch means exceeds a predetermined limit; and
   memory means for storing data related to the positions of preselected fuel rods in said module and the locations of transferred fuel rods.

5. A system as set forth in claim 4, further comprising closed circuit television (CCTV) camera means for enabling an operator of the system to align properly and to confirm the correct positioning of said grapple assembly means over a selected fuel rod.

6. A system as set forth in claim 4, wherein said collet means includes push rod means, located in the center of said inner sleeve means, for detecting whether said fuel rod is completely engaged by said collet means, said control means further including transducer means for measuring the distance travelled by said push rod means upon contact with said fuel rod, said fuel rod being monitored as fully engaged when said distance travelled exceeds a predetermined value.

7. A system as set forth in claim 2, wherein said fuel rod grapple assembly means further includes means for rotating said collet means by a predetermined angle when a fuel rod which is being removed has been retracted a predetermined distance out of said reactor module, to avoid damaging cladding groves on said fuel rod.

8. A system as set forth in claim 1 further including CCTV camera means for assisting the operator of said system in aligning said fuel rod grapple assembly means with said fuel rods.

* * * * *